United States Patent [19]

Gilliam

[11] 4,215,676

[45] Aug. 5, 1980

[54] FRAME ARMS FOR SOLAR COLLECTOR

[76] Inventor: George A. Gilliam, 328 Kennedy Ave., Chillicothe, Mo. 64601

[21] Appl. No.: 950,316

[22] Filed: Oct. 11, 1978

[51] Int. Cl.² .......................... F24J 3/02; F28D 1/00
[52] U.S. Cl. .................................. 126/448; 126/450; 165/150; 165/152; 165/173
[58] Field of Search ............... 126/271, 270, 438, 448, 126/450; 237/1 A; 165/172, 173, 174, 176, 150, 152, 153

[56] References Cited

U.S. PATENT DOCUMENTS

| | | | |
|---|---|---|---|
| 748,696 | 1/1904 | Browning | 126/271 |
| 869,577 | 10/1907 | Lacing | 165/150 |
| 1,258,405 | 3/1918 | Harrison | 126/271 |
| 1,802,635 | 4/1931 | Eaton | 126/271 |
| 1,837,449 | 12/1931 | Kunz | 126/271 |
| 2,028,456 | 1/1936 | Karmazin | 165/150 |
| 2,322,145 | 6/1943 | Kritzer | 165/150 |
| 3,215,134 | 11/1965 | Thomason | 126/271 |
| 3,464,402 | 9/1969 | Collura | 126/271 |
| 4,018,215 | 4/1977 | Pei | 126/271 |
| 4,117,831 | 10/1978 | Bansal et al. | 126/271 |
| 4,121,566 | 10/1978 | Radenkovic | 126/271 |
| 4,137,097 | 1/1979 | Kelly | 126/271 |

Primary Examiner—James C. Yeung
Assistant Examiner—Daniel O'Connor
Attorney, Agent, or Firm—D. A. N. Chase; Michael Yakimo, Jr.

[57] ABSTRACT

A solar collector device generally comprises two laterally spaced apart frame arms with sockets located therein for the reception and support of solar collector pipes transversely extending therebetween. Within each frame arm, selected pairs of sockets are placed in fluid communication by means of intersecting ducts, each duct respectively emanating from a socket of each socket pair. This socket/duct network achieves a serial back-and-forth flow, relative to the frame arms, of solar collector fluid throughout the collector pipes from the point of fluid intake to the point of fluid discharge. Located underneath the collector pipe array is a reflective surface having upwardly directed channels, each collector pipe lying within each channel along its transverse span. The channel sides are angularly positioned so as to provide maximum solar ray reflectance and attendant absorption by the collector fluid throughout its serial flow.

6 Claims, 6 Drawing Figures

FRAME ARMS FOR SOLAR COLLECTOR

BACKGROUND OF THE INVENTION

This invention relates to solar collector apparatus and, more particularly, to improvements in apparatus frame arms which rigidly support solar collector pipes and, specifically, to integral frame arm conduits for fluid communication among the pipes, so as to achieve a serial and thermal-efficient fluid flow throughout the collector apparatus.

It is desirable in solar collectors to increase the solar exposure of the heat exchange medium as to maximize the solar ray/liquid medium heat exchange action. One response to this desire has been to provide an array of solar collector pipes connected in series so as to provide a serial flow of the liquid medium from its inception into the collector apparatus to its discharge.

Previously the achievement of such a flow pattern, as dictated by the design of the solar collector itself, necessitated the bending of the collector tubes so as to reverse the flow direction of the liquid relative to adjacent collector tubes. The bending of these pipes, if not properly done, resulted in crimping of the pipe at the point of flexion and thus limited the maximum liquid flow throughout the pipes which decreased overall solar collector efficiency. Also, such bending did not contribute to a desired structural rigidity and introduced unwanted stress and strain to the collector pipes at the point of flexion, resulting in premature fatigue of the individual collector pipes.

Couplings used to connect the free ends of adjacent pipes have provided the serial flow but necessarily required the addition of relatively complex and expensive parts to a solar collection system, thus decreasing the ease of manufacturing and system maintenance resulting in an increase in overall system cost.

Stress concentration and damage to the solar heating apparatus constructed in accordance with the present invention is minimized by use of novel apparatus frame arms so as to internally and fluidly interconnect the free ends of the solar collector pipes within the frame arms. The frame arms act as both shock absorbers and self aligners to protect the collector tubes inserted therein.

SUMMARY OF THE INVENTION

In the practice of this invention, a pair of laterally spaced apart frame arms respectively comprise a main body member, an end cap member mounted to the main body member with a gasket located therebetween. Located within each main body member are generally horizontal sockets bored therein so as to receive the respective free ends of the solar collector pipes transversely spanning the frame arm pair. A selected socket has a duct leading thereto for the introduction of solar collector fluid, from an external source, into the solar collector apparatus. Another socket downstream from the fluid input socket, has a duct emanating therefrom for discharge of the solar heated fluid for subsequent flow to heat exchange devices displaced from the solar collector device itself.

Between the input and output ducts a serial back-and-forth flow path for the solar collector fluid is achieved, relative to the frame arms, by selectively intercommunicating adjacent pairs of sockets in the frame arms in an alternating fashion by means of pairs of intersecting ducts within the frame arms extending from corresponding pairs of sockets. The ducts have orifices on the exterior side of the frame arm main body member which are sealed by the gasket with the end cap member securely mounted therealong. Located underneath the collector pipes is a reflective plate member having upwardly extending U-shaped channels formed by planar surfaces extending at a selected angle from the reflective plate. Adjacent channel sides converge toward each other and intersect above the reflective plate at a 90° angle. The thus formed channels with a collector pipe lying therein are selectively longitudinally spaced so that a three-to-one ratio is achieved, as determined by the distance between the center of adjacent collector pipes over the pipe diameter itself. This ratio, in conjunction with the above-mentioned 90° angle of intersection, has been found to efficiently focus the suns rays on the surfaces of the collector pipes, without resort to parabolic reflectors and the like so as to achieve optimum heat exchange between the solar rays and collector pipes, and the fluid flowing therein. The solar/ray collector pipe heat exchange transaction acts in concert with the transverse serial flow of the collector fluid to prolong the exposure of the collector fluid to the solar energy, and thus optimize the heat exchange process.

It is, therefore, an important object of this invention to provide a solar collector apparatus which is simple and inexpensive to construct, easy to maintain and efficient in operation.

Another important object of this invention is to provide an apparatus, as aforesaid, with a serial flow of the collector fluid throughout so as to extend the time of heat exchange contact of the fluid with the solar energy.

Still, a further important object of this invention is to provide frame arms supporting a plurality of solar collector pipes, having integral conduit means therein to achieve the aforesaid serial flow while avoiding the necessity of bending the solar collector pipes.

A more particular object of the present invention is to provide frame arms, as aforesaid, which rigidly support the solar collector pipes and, therefore, provide desired stability to the overall solar collector apparatus.

Another specific object of the present invention is to provide such frame arms which are easy to construct and maintain and are efficient in operation.

Another important object of this invention is to provide a solar ray reflector, so constructed as to optimally focus the solar rays on a plurality of collector pipes lying thereabove, so as to maximize the solar/ray collector fluid heat exchange.

Other objects and advantages will become apparent from the following description taken in connection with the accompanying drawings wherein a preferred embodiment of the invention is set forth by way of illustration and example.

DESCRIPTION OF THE PREFERRED EMBODIMENT

Figure 1:
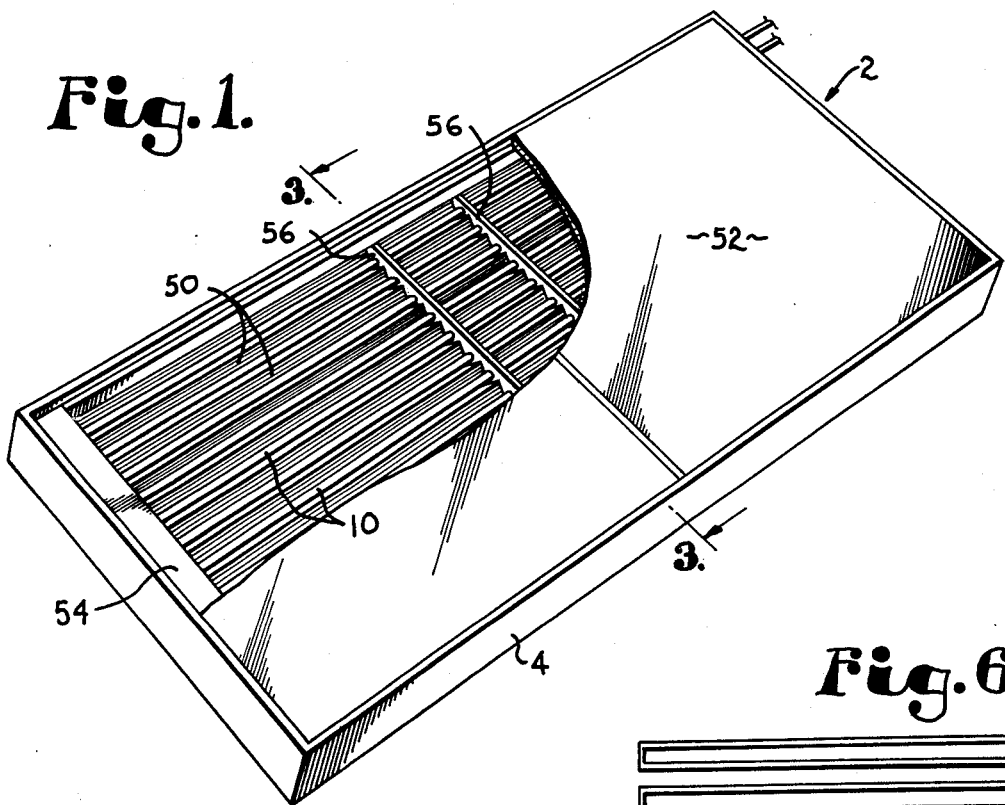
FIG. 1 is a perspective view of the solar collector device with a part of the overlying glass pane broken away to show the collector tubes and reflectors.

Referring more particularly to the drawings, FIG. 1 shows the solar collector apparatus 2 having a rectangular main-frame member 4 encompassing the main body of the collector system. Included therein are first and second frame arms 6 and 8 positioned in a laterally spaced apart relationship to enable these frame arms, constructed as subsequently described, to internally receive the free ends of a plurality of solar collector pipes 10 spanning therebetween. The solar collector pipes 10 are preferably made of copper tubing so as to provide ease of construction, economy of cost, effective entrainment and BTU exchange actions. These collector pipes 10 are preferably of equal dimension.

Each frame arm 6 and 8 generally comprises a body member 12, a sealant gasket 14 and an end cap member 16. A generally horizontal rail 18, integral within the frame arm body member 12 is located along an interior side thereof. Bored into the vertical surface 20 of each rail 18 are a plurality of sockets 22 of such dimension as to provide an interference fit with the free ends of the respective collector pipes 10. The horizontal sockets 22 are easily drilled into the rail vertical surface 20 with common drill apparatus and are preferably equally spaced along the frame arm rail 18 with each socket 22 in the first frame arm 6 aligned with a corresponding socket in the second frame arm 8. At the interior terminal surface of the socket 22 a smaller drill bit is used to bore throughout the frame arm forming an orifice 24 for the reception of a frame arm connecting bolt 26 therein. Once the free ends of each collector pipe 10 are emplaced within the respective sockets 22 each pipe 10 may be fixed therein by soldering 28 or weld.

Depending on the collector pipe length, braces 56 may or may not be used to provide medial support both to the collector pipe network and mainframe 4. When such braces 56 are in use, each collector pipe 10 will pass therethrough before emplacement in the sockets 22 as described above.

Two sockets, preferably at the opposite ends of the first 6 or second frame arm 8, are selected as intake 30 and discharge ports 32. These selected sockets 30 and 32 extend throughout the frame arm with the collector pipe free ends therein connected to a solar collector fluid inlet pipe 34 and to an outlet pipe 36 for fluid discharge to an area displaced from the apparatus whether to a heat exchanger or reservoir (not shown).

Figure 6:
FIG. 6 is a schematic illustration showing the serial flow of the collector fluid through the pipes.
Figure 2:
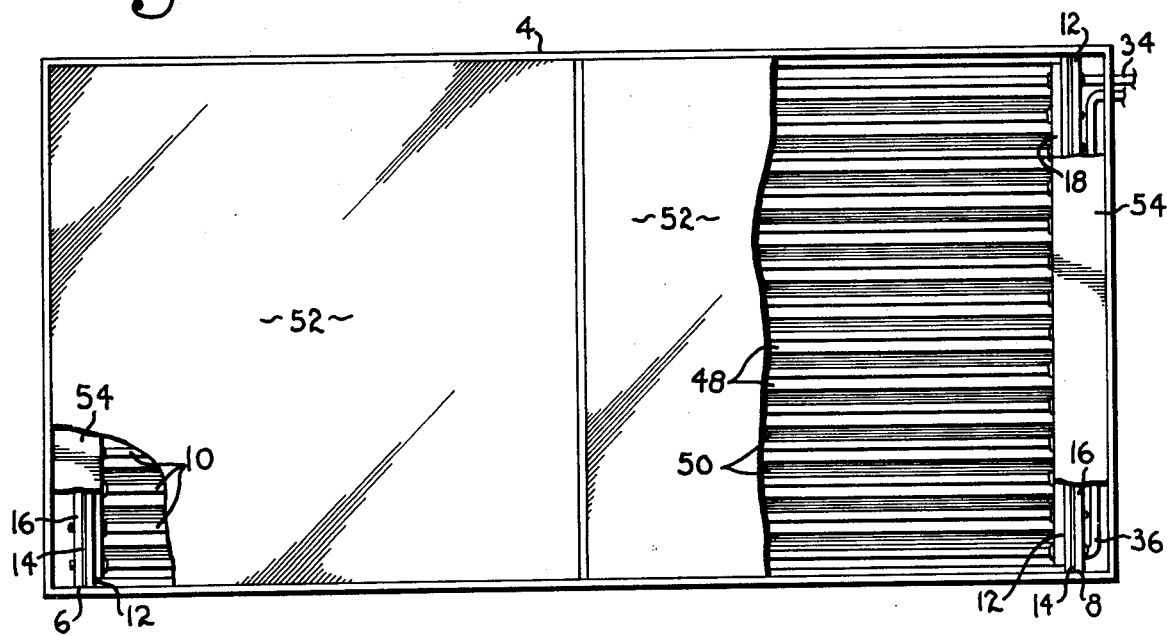
FIG. 2 is a top plan view with parts of the glass pane broken away to reveal the input and output connections and the end bar/end cap frame configuration.

A serial path for the solar collector fluid, as shown in FIG. 6, is achieved by placing selected pairs of adjacent sockets 22, with collector pipes 10 therein, in each frame arm 6 and 8 in fluid communication therebetween. This serial path as diagrammatically shown in FIG. 6 is a back-and-forth flow path, relative to the frame arms 6 and 8, so that the fluid flow through adjacent collector pipes 10 is in opposite directions.

Figure 4:
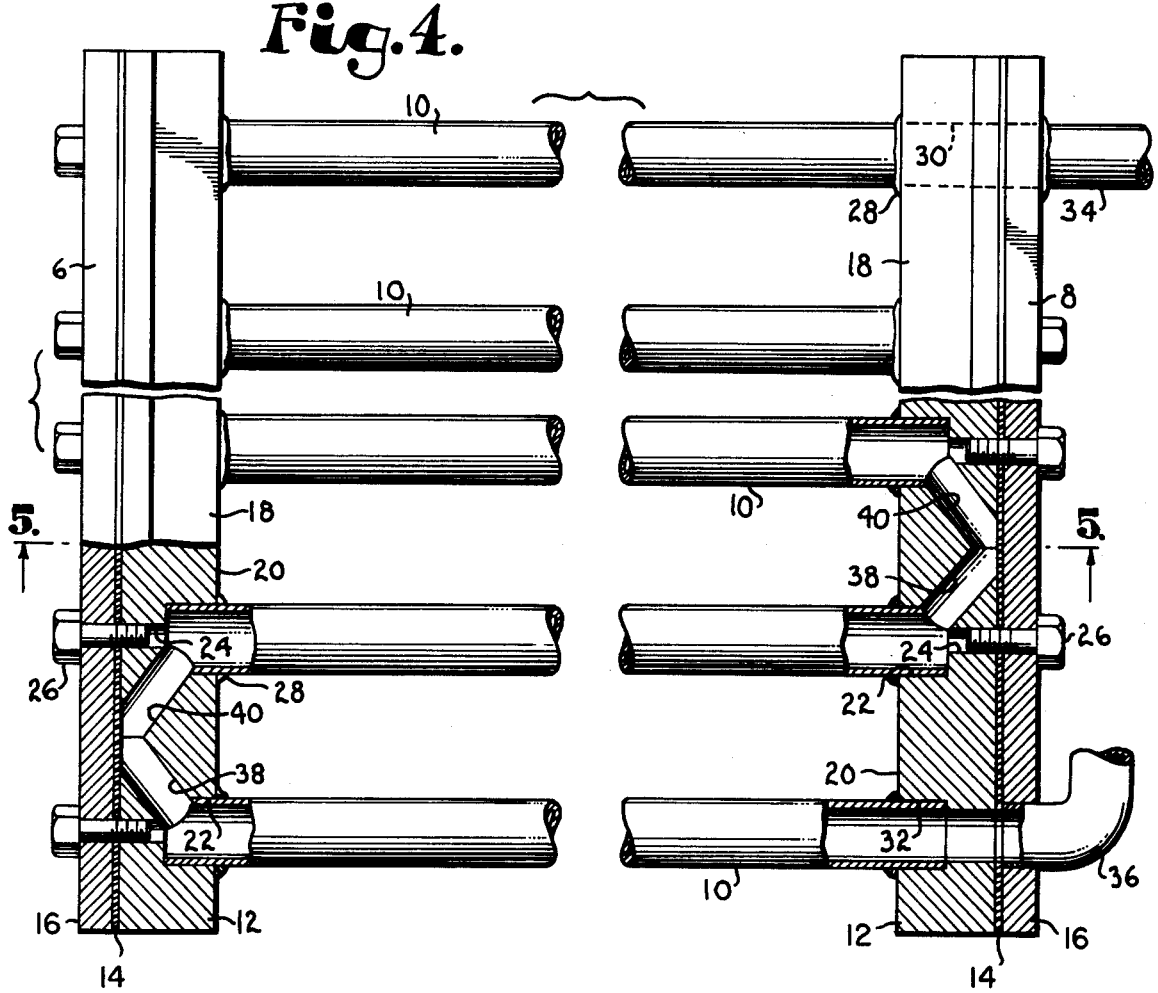
FIG. 4 is a fragmentary, top plan view on the same scale as FIG. 3, showing the internal construction of the solar collector device.
Figure 5:
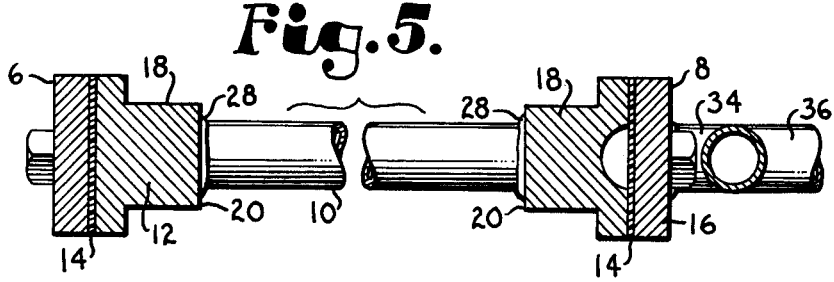
FIG. 5 is a fragmentary, vertical cross-sectional view taken along line 5—5 of FIG. 4.

This inter-socket fluid communication and ultimate serial fluid flow is achieved by drilling ducts in the frame arm body member 12 at an angle from the outside surface of each body member through each socket side wall with the collector pipe free end engaged therein. As shown in FIG. 4, separate ducts 38 and 40 enamate from each socket of the selected pair and intersect therebetween. Proper selection of the socket pairs dictates that each collector pipe 10, as emplaced in the left and right frame arm sockets 22, has associated with the pipe/socket emplacements an input duct 38 for receiving collector fluid from upstream, and an output duct 40 at the opposite pipe/socket emplacement for the downstream discharge of the collector fluid. The location of the input duct 38 and output duct 40 for each collector pipe 10 alternates between the left frame arm 6 and right frame arm 8 as the fluid progresses downstream. Thus, the input duct 38 of a given collector pipe 10 intersects with the output duct 40 of the adjacent upstream collector pipe 10. At the opposite end of the given collector pipe, the output duct 40 thereof intersects with the input duct 38 of the adjacent downstream collector pipe 10. This pattern of input/output duct intersection alternates between the left and right frame arms from the point of collector fluid input 30 to the point of discharge 32.

Once the ducts 38 and 40 have been properly drilled in each frame arm body member 12, the sealant gasket 14 is placed over the outside wall of each frame arm body member 12 and the end cap member 16 is then placed therealong. The end cap member 16 is securely fastened to the body member 12 with the sealant gasket 14 in between by means of bolts 26 extending therebetween. This frame arm/collector pipe network may then be connected to the walls of the mainframe 4 in a suitable manner such as by bolts/nuts and the like.

Figure 3:
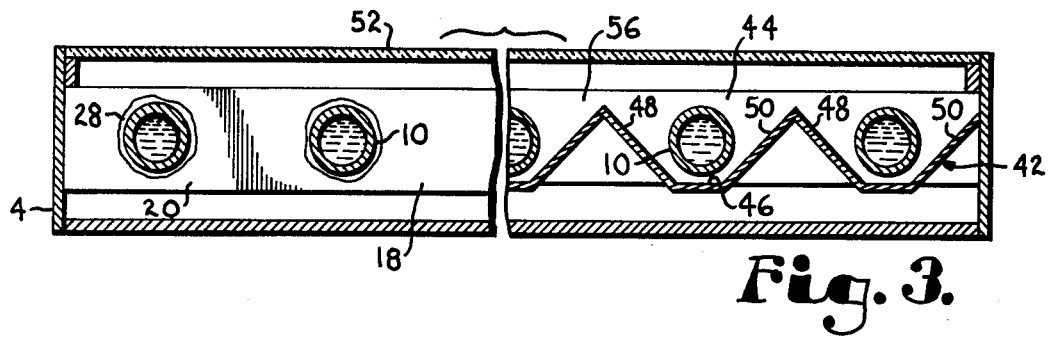
FIG. 3 is an enlarged, fragmentary, vertical cross-sectional view taken along line 3—3 of FIG. 1.

Within the mainframe 4 a reflector plate 42 is positioned beneath the collector pipe array. This plate 42 is made of a material suitable for reflecting the solar rays. As shown in FIG. 3, the reflector plate comprises a plurality of open channels 44 corresponding to each collector pipe 10 so as to allow each pipe 10 to lie freely within each channel. Each channel has a generally planar base 46 surface with generally divergent opposite sides 48 and 50. Each channel side 48 and 50 intersects with an adjacent channel side 50 and 48, respectively, at a 90° angle. The channels 44 themselves are preferably identical in construction and are spaced according to the diameter of the collector pipe 10 to be used. The distance between adjacent collector pipes 10 is preferably equal so that a three-to-one ratio is achieved when the center-to-center distance between adjacent pipes is compared to the collector pipe outside diameter.

This three-to-one ratio acts in conjunction with the above-mentioned angle of intersection to optimally focus the solar rays on the collector pipes 10 positioned in their respective channels 44 so as to maximize both the solar ray/collector pipe and ultimately the collector fluid heat exchange transactions. A transparent glass 52 cover resting on a main-frame shelf 54 lies over the entire frame arm/collector pipe network and aids in the reduction of solar heat loss upon reflectance from the plate 42.

As can be seen from the above, the solar collector network and, particularly, the frame arm apparatus can be easily constructed. The solar collector apparatus can be used as part of a closed loop system in which the solar heated collector fluid is fed to an external heat exchanger. Water itself may be used as the collector fluid which would be discharged to an external reservoir upon sustaining a desired temperature level.

It can be seen that the frame arms 6 and 8 themselves add rigidity and structural stability to the system and have negated the necessity to bend pipes or to use expensive copper tubing especially designed for such bending when a serial collector fluid flow path is desired. Although the fluid may flow through the above defined path due to the principles of gravity, entrainment and thermal syphon circulation, it is understood that a pump may be inserted into the loop so as to aid the solar collector fluid circulation.

Having thus described the invention, what is claimed as new and desired to be secured by Letters Patent is:

1. A solar collector apparatus comprising: first and second, laterally spaced, elongated frame arms;
    a series of side by side solar collector pipes spanning said frame arms, each of said pipes having a pair of opposed ends;
    inlet means for introducing a solar collector fluid into one of said ends of the initial pipe of said series;
    outlet means for discharging said fluid from one of said ends of the last pipe of said series;
    each of said frame arms including a continuous body member presenting opposed, inside and outside surfaces and having a series of longitudinally spaced apart sockets therein extending inwardly from said inside surface and receiving corresponding ends of the pipes,
    said body members further having internal passage means intercommunicating adjacent pairs of sockets of successive pairs of pipes in alternate arms to provide for serial flow of said fluid through said series of pipes from said inlet means to said outlet means,
    said passage means including an input duct and an output duct associated with each collector pipe and respectively communicating with the opposed ends of the pipe through the corresponding sockets, each pipe of said series of pipes having said associated input and output ducts at ends opposite from adjacent upstream or downstream collector pipes,
    each input duct of each collector pipe downstream from said initial pipe communicating with the output duct of the adjacent upstream collector pipe and extending to a zone of intersection at said outside surface of the respective body member between the associated sockets to present an orifice at said outside surface, whereby a number of said orifices are provided and are spaced longitudinally along said outside surfaces of said body members;
    each of said frame arms further including an elongated cap member and means securing the latter to the body member thereof over the orifices therein to seal the same.

2. The solar collector apparatus as claimed in claim 1, wherein said inlet means comprises:
    a socket receiving one of said ends of said initial pipe and extending throughout said frame arm, said extended socket communicating with means for introducing said solar collector fluid therein.

3. The solar collector apparatus as claimed in claim 2, wherein said end of said initial pipe projects through said extended socket and connects with said solar collector fluid introduction means.

4. The solar collector apparatus as claimed in claim 1, wherein said outlet means comprises:
    a socket receiving one of said ends of said last pipe and extending throughout said frame arm, said extended socket communicating with means for receiving said discharged solar collector fluid therefrom.

5. The solar collector apparatus as claimed in claim 4, wherein said end of said last pipe projects through said extended socket for connection to said means for receiving said discharged solar collector fluid.

6. In a solar collector apparatus having first and second frame arms with a series of side by side solar collector pipes spanning said frame arms, each of said pipes having a pair of opposed ends, and inlet means for introducing a solar collector fluid into one of said ends of the initial pipe of said series and outlet means for discharging said fluid from one of said ends of the last pipe in said series, the improvement wherein:
    each of said frame arms includes a continuous body member presenting opposed, inside and outside surfaces and having a series of longitudinally spaced apart sockets therein extending inwardly from said inside surface and receiving corresponding ends of the pipes,
    said body members further having internal passage means intercommunicating adjacent pairs of sockets of successive pairs of pipes in alternate arms to provide for serial flow of said fluid through said series of pipes from said inlet means to said outlet means,
    said passage means including an input duct and an output duct associated with each collector pipe and respectively communicating with the opposed ends of the pipe through the corresponding sockets, each pipe of said series of pipes having said associated input and output ducts at ends opposite from adjacent upstream or downstream collector pipes,
    each input duct of each collector pipe downstream from said initial pipe communicating with the output duct of the adjacent upstream collector pipe and extending to a zone of intersection at said outside surface of the respective body member between the associated sockets to present an orifice at said outside surface, whereby a number of said orifices are provided and are spaced longitudinally along said outside surfaces of said body members; and
    each of said frame arms further includes an elongated cap member and means securing the latter to the body member thereof over the orifices therein to seal the same.

* * * * *